United States Patent
Nakhmanovich et al.

(10) Patent No.: US 6,846,851 B2
(45) Date of Patent: Jan. 25, 2005

(54) WATER-BASED INKJET INKS CONTAINING AN ULTRAVIOLET CURABLE HUMECTANT

(76) Inventors: Gregory Nakhmanovich, 7/17 Y. Perah Street, Netanya (IL); Ilan Hidana, 10/8 Ha'alon Street, Kadima 60920 (IL); Moshe Frenkel, 9/7 Naphtali Street, Jerusalem 93507 (IL)

( * ) Notice: Subject to any disclaimer, the term of this patent is extended or adjusted under 35 U.S.C. 154(b) by 0 days.

(21) Appl. No.: 10/413,475

(22) Filed: Apr. 15, 2003

(65) Prior Publication Data

US 2004/0209976 A1 Oct. 21, 2004

(51) Int. Cl.$^7$ ............... C08F 2/46; C08F 2/50
(52) U.S. Cl. ............ 522/84; 522/86; 522/85; 522/104; 522/107; 522/74; 522/71; 522/81; 522/75; 522/182; 522/113; 522/120; 522/121
(58) Field of Search ............ 522/71, 74, 75, 522/81, 104, 107, 113, 121, 120, 182, 84, 85, 86

(56) References Cited

U.S. PATENT DOCUMENTS

| | | | |
|---|---|---|---|
| 4,210,566 | A | 7/1980 | Murray |
| 4,465,800 | A | 8/1984 | Bhatia |
| 4,484,948 | A | 11/1984 | Merritt et al. |
| 5,417,747 | A | 5/1995 | Arata et al. |
| 5,623,001 | A | 4/1997 | Figov |
| 5,889,083 | A | 3/1999 | Zhu |
| 6,030,438 | A | 2/2000 | Erdtmann et al. |
| 6,126,731 | A | 10/2000 | Kemeny et al. |
| 6,294,592 | B1 | 9/2001 | Herrmann et al. |
| 6,326,419 | B1 | 12/2001 | Smith |
| 6,428,862 | B1 | 8/2002 | Noguchi |
| 2002/0004539 | A1 | 1/2002 | Smith |

FOREIGN PATENT DOCUMENTS

| | | |
|---|---|---|
| EP | 0 853 108 | 7/1998 |
| EP | 0 867 483 | 9/1998 |
| EP | 1 113 054 | 7/2001 |
| EP | 1 247 821 A | 10/2002 |
| JP | 5186725 | 7/1993 |
| JP | 7041712 | 7/1993 |
| JP | 8048922 | 2/1996 |
| JP | 11263933 | 9/1999 |
| JP | 2000117960 | 4/2000 |
| JP | 2001081365 | 3/2001 |
| JP | 2001115067 | 4/2001 |
| JP | 2001158865 | 6/2001 |
| JP | 2001311020 | 11/2001 |
| JP | 2002080767 | 3/2002 |
| WO | WO 94/03546 | 2/1994 |
| WO | WO 97/31071 | 8/1997 |
| WO | WO 01/25340 A | 4/2001 |
| WO | WO 02/38688 | 5/2002 |
| WO | WO 02/064689 | 8/2002 |

OTHER PUBLICATIONS

Hiromichi Noguchi et al., "An Aqueous UV Curable Inkjet Printing for Graphic Output", NIP 17: International Conference on Digital Printing Technologies, pp. 332–335.

Patent Abstracts of Japan. vol. 2000, No. 24, May 11, 2001 & JP 2001 181528 A (Sekisui Chem Co Ltd), Jul. 3, 2001.

*Primary Examiner*—James J. Seidleck
*Assistant Examiner*—Sanza L. McClendon
(74) *Attorney, Agent, or Firm*—Eitan, Pearl, Latzer & Cohen Zedek, LLP

(57) ABSTRACT

A composition for ink-jet recording is provided. The composition comprises a water miscible resin and a water-soluble ultraviolet curable humectant. The concentration of the water-soluble ultraviolet curable humectant may be in the range of 5% to 50% by weight. Examples of such humectants may include polyalkylen glycol acrylates, polyethers acrylates, and highly ethoxylated derivatives of acrylates.

18 Claims, No Drawings

WATER-BASED INKJET INKS CONTAINING AN ULTRAVIOLET CURABLE HUMECTANT

BACKGROUND OF THE INVENTION

The inkjet printing industry may use oil-based inks, solvent-based inks, water-based inks and solid inks. When industrial water-based inks, containing binders, are jetted from the nozzles, water partially or fully evaporates from the ink such that the remaining binder together with pigment particles produce a film in the nozzles, thus leading to irreversible clogging of the nozzles.

Using humectants in the ink formulation may reduce or eliminate nozzle clogging. However, humectants significantly reduce the drying rate of the printed image. This problem becomes more critical for higher printing speeds, for a non-porous substrate and for a substrate that is sensitive to high temperatures. Moreover, during the drying process the humectants, which are volatile organic compounds (VOC), emit vapors and therefore pollute the environment.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, formulation and compositions have not been described in detail so as not to obscure the present invention.

Some embodiments of the present invention are directed to various compositions of a water-based ink-jet recording fluid containing an ultraviolet (UV) curable humectant. According to some embodiments of the present invention, the ink composition comprises water as the main carrier, a water miscible resin as the binder substance, and one or more water-soluble UV-curable humectants. Throughout the specification and the claims, the term "miscible" refers to either a water-soluble or a water-dispersible component.

The relative amounts of the different components of the ink-jet recording fluid may vary. For example, the relative amount of the water-soluble UV-curable humectant may vary between 5 weight percentage and 50 weight percentage.

According to some embodiments of the present invention, the relative amount of water-soluble UV curable humectant may be 5 wt %–10 wt %. According to some embodiments of the present invention, the relative amount of water-soluble UV-curable humectant may be 10 wt %–15 wt %. According to some embodiments of the present invention, the relative amount of water-soluble UV-curable humectant may be 15 wt %–20 wt %. According to some embodiments of the present invention, the relative amount of water-soluble UV-curable humectant may be 20 wt %–25 wt %. According to some embodiments of the present invention, the relative amount of water-soluble UV-curable humectant may be 25 wt %–30 wt %. According to some embodiments of the present invention, the relative amount of water-soluble UV-curable humectant may be 30 wt %–35 wt %. According to some embodiments of the present invention, the relative amount of water-soluble UV-curable humectant may be 35 wt %–50 wt %.

The composition may further comprise a photo-initiator, any coloring agent, such as for example pigment and/or dye, and optionally surfactants such as wetting agents, leveling agents and the like. Additionally, the composition may comprise additives, such as for example preservatives, antimolds and the like to enhance storage and shelf stability.

Ink compositions according to some embodiments of the present invention may reduce the drying time of the printed image as compared to a similar composition having non-curable humectants. The ink composition may possess good adhesion properties. It may adhere to a wide range of substrates including absorbing materials such as paper and cardboards and non-absorbing materials such as plastics, glass and metals. Moreover, inks according to some embodiments of the present invention may prevent nozzle clogging and mis-directionality problems even after long periods of continuous printing. Also, according to some embodiments of the present invention, the ink composition virtually does not contain volatile organic compounds.

Resins

Any suitable binder resin may be used. Although the scope of present invention is not limited in this respect, the binder resin may be a water dispersible resin, a water-soluble resin, a water-dispersible UV-curable resin and any combination thereof.

Non-limiting examples of water-dispersible resins may include water-based emulsions of polymers, such as, for example, polyacrylates, polyurethanes, polyesters, polyvinylchlorides and polyacetates. Additional non-limiting examples of water dispersible resins may include emulsions of copolymers, such as for example polyacrylate-polystyrene and polyacrylate-polyurethane. The emulsions may be stabilized either ionically or non-ionically.

Non-limiting examples of water-soluble resins may include alkaline-soluble polyacrylate and polyvinyl pyrrolidone.

Non-limiting examples of water-dispersible UV-curable resins may include resin-in-water emulsions of a UV-curable compound having at least two reactive unsaturated groups such as acrylic groups. Non-limiting examples of such UV-curable resins may include aliphatic or aromatic urethane actylates, epoxy acrylates and polyester acrylates.

Humectants

The term "radiation curable humectants" may include any water-soluble monomer, oligomer or polymer having one or more UV-curable unsaturated groups and having a boiling point generally above 170° C. Non-limiting examples of such humectants may include polyalkylen glycol acrylates, polyethers acrylates, and highly ethoxylated derivatives of acrylates.

A specific example of such materials may include polyethylene glycol diacrylates available commercially from Sartomer Company, Exton, Pa., USA, under the names Sartomer 344 and Sartomer 610 or from UCB Chemicals, Drogenbos, Belguim, under the name Ebecryl 11. Another non-limiting example is polyether triacrylate available commercially from from UCD Chemicals, Drogenbos, Belguim under the name Ebecryl 12. Yet another example may be highly ethoxylated derivatives of trimethylolpropane triacrylate and bisphenol A diacrylate available commercially from Sartomer Company under the names SR 415, SR 9035 and CD 9038.

Photoinitiators

The photoinitiators may comprise one or more water-soluble or water dispersible free radical photoinitiators. Non-limiting examples of photoinitiators may include Irgacure 2959, Irgacure 500, Irgacure 819W, Darocur 1173, Darocur 4665, Darocur 1664, Darocur 4043, Darocur 4263, and Darocur 4265, all available from Ciba-Geigy, Basel, Switzerland.

EXAMPLES

In the following examples of ink compositions, component designations are in weight percentages. Furthermore, all the examples are prepared in a similar manner to example 1, which preparation is described in more detail below. It is noted that the following examples do not limit in any way the scope of the present invention.

Example 1

| Weight % | Ingredient |
|---|---|
| 9 | Acrylic polymer emulsion, sold under the trade name of Joncryl 538 by S.C Johnson. Emulsion of a non curable resin |
| 20 | Polyether triacrylate, sold under the trade name of Ebecryl 12 by UCB Chemicals. UV-curable humectant |
| 3 | 1-[4-(2-hydroxyethyl)phenyl]-2-hydroxy-2-methylpropane-1-one, sold under the trade name of Irgacure 2959 by Ciba-Geigy. Photoinitiator |
| 6 | Rubin pigment sold under the trade name of Hostafine Rubin F6B by Clariant GmbH |
| 0.3 | BYK-345 wetting agent |
| balance | de-ionized water |

The inkjet ink composition of Example 1 was prepared in the following mixing order: starting with Ebecryl 12; adding photoinitiator and mixing at 100° C. until it dissolves; adding de-ionized water; adding Joncryl 538; adding pigment dispersion of Hostafine rubin F6B; adding BYK 345 as surfactant or wetting agent and continuing mixing for approximately half an hour.

Example 1 demonstrates a water-based ink composition comprising a non-curable resin emulsion and a UV-curable humectant. The ink was applied (18 μm thickness) on various substrates such as cardboards, PVC and plastics. The ink was first heated at 90° C. for 30 seconds to evaporate water. The heating was followed by UV radiation to cure the rest of the film. A flash Xenon discharge lamp (450 torr, available from Heraeus Noblelight, Cambridge, UK) has been used at a frequency of 50 Hertz, energy of 39 joules/pulse and for 180 pulses.

The composition described above has been jetted from a print head manufactured by Aprion Ltd. of Netanya, Israel and jetting properties were tested. No clogging of print-head nozzles has been observed. No mis-directionality problems have been detected even after long periods of continuous printing.

Example 2

| Weight % | Ingredient |
|---|---|
| 9 | Ammonia solution of an acrylic resin, sold under the trade name of Joncryl SCX 8078 by S.C Johnson. Solution of a non curable resin |
| 40 | Polyether triacrylate, sold under the trade name of Ebecryl 12 by UCB Chemicals. UV-curable humectant |
| 3 | 1-[4-(2-hydroxyethyl)phenyl]-2-hydroxy-2-methylpropane-1-one, sold under the trade name of Irgacure 2959 by Ciba-Geigy. Photoinitiator |
| 6 | Rubin pigment sold under the trade name of Hostafine Rubin F6B by Clariant GmbH |
| 0.3 | BYK-345 wetting agent |
| balance | de-ionized water |

The inkjet ink composition of example 2 was prepared in the following mixing order: starting with Ebecryl 12; adding photoinitiator and mixing at 100° C.; adding de-ionized water; adding Joncryl SCX 8078; adding pigment dispersion of Hostafine rubin F6B; adding BYK 345 as surfactant or wetting agent and continuing mixing for approximately half an hour.

Example 2 demonstrates a water-based ink composition comprising a non-curable resin solution and a UV-curable humectant. The ink was applied (18 μm thickness) on various substrates such as cardboards, PVC and plastics. The ink was first heated at 90° C. for 30 seconds to evaporate water. The heating was followed by UV radiation to cure the rest of the film. A flash Xenon discharge lamp (450 torr, available from Heraeus Noblelight, UK) has been used at a frequency of 50 Hertz, energy of 39 joules/pulse and for 180 pulses.

The composition described above has been jetted from a print head manufactured by Aprion Ltd. of Netanya, Israel and jetting properties were tested. No clogging of print-head nozzles has been observed. No mis-directionality problems have been detected even after long periods of continuous printing.

Example 3

| Weight % | Ingredient |
|---|---|
| 40 | Acrylic functional polyurethane dispersion, sold under the trade name of NeoRad R-441 by NeoResins (Avecia). Emulsion of a UV-curable resin |
| 30 | Polyethylene glycol 400 diacrylate, sold under the trade name of Sartomer 344 by Cray Valley. UV-curable humectant |
| 3 | 1-[4-(2-hydroxyethyl) phenyl]-2-hydroxy-2-methylpropane-1-one, sold under the trade name of Irgacure 2959 by Ciba-Geigy. Photoinitiator |
| 6 | Rubin pigment sold under the trade name of Hostafine Rubin F6B by Clariant GmbH |
| 0.3 | BYK-345 wetting agent |
| balance | de-ionized water |

The inkjet ink composition of example 3 was prepared in the following mixing order: starting with Sartomer 344; adding photoinitiator and mixing at 100° C. until it dissolves; adding de-ionized water; adding Neorad R-441; adding pigment dispersion of Hostafine rubin F6B; adding BYK 345 as surfactant or wetting agent; and continuing mixing for approximately half an hour.

Example 3 demonstrates a water-based ink composition comprising an UV-curable oil-in water resin emulsion and a UV-curable humectant. The ink was applied (40 μm thickness) on various substrates such as cardboards, PVC and plastics. The ink was heated at 90° C. for 10 seconds to evaporate the water. Then the ink was irradiated by UV radiation to cure the rest of the film. A flash Xenon discharge lamp (450 torr, available from Herause, UK) has been used at a frequency of 50 Hertz, energy of 39 joules/pulse and for 180 pulses. The cured film has shown good mechanical properties on various substrates such as cardboards and PVC plastics.

The composition described above has been jetted from a print head manufactured by Aprion Ltd. of Netanya, Israel and jetting properties were tested. No clogging of print-head nozzles has been observed. No mis-directionality problems have been detected even after long periods of continuous printing.

Example 4

| Weight % | Ingredient |
|---|---|
| 40 | Aliphatic urethane acrylate emulsion, sold under the trade name of Viactin VTE 6155w by Solutia Inc. Emulsion of a UV-curable resin |
| 10 | Polyethylene glycol 400 diacrylate, sold under the trade name of Sartomer 344 by Cray Valley. UV-curable humectant |
| 2 | Bland of 2,4,6-trimethylbenzoyl-diphenyl-phosphine oxide and 2-hydroxy-2-methyl-1-phenyl-propan-1-one (50:50 mixture), sold under the trade name of Darocur 4265 by Ciba-Geigy. Photoinitiator |
| 6 | Rubin pigment sold under the trade name of Hostafine Rubin F6B by Clariant GmbH |
| 0.3 | BYK-345 wetting agent |
| balance | de-ionized water |

The inkjet ink composition listed above was prepared in the following mixing order: starting with Sartomer 344; adding de-ionized water; adding emulsion of Viactin VTE 6155w; adding photoinitiator; adding pigment dispersion of Hostafine rubin F6B; adding BYK 345 as surfactant or wetting agent and continuing mixing for approximately half an hour.

Example 4 demonstrates another example of a water-based ink composition comprising a UV-curable oil-in water resin emulsion and a reactive UV-curable humectant. The ink was applied (40 μm thickness) on various substrates such as cardboards, PVC and plastics. The ink was first heated at 90° C. for 10 seconds to evaporate the water. Then the ink was irradiated by UV radiation to cure the rest of the film. A flash Xenon discharge lamp (450 torr, available from Herause Noblelight, UK) has been used at a frequency of 50 Hertz, energy of 39 joules/pulse and for 180 pulses.

The cured film has shown good adhesion properties on various non-swellable substrates such as polycarbonate, polyehtylene and polypropylene. The composition described above has been jetted from a print head manufactured by Aprion Ltd. of Netanya, Israel and jetting properties were tested. No clogging of print-head nozzles has been observed. No mis-directionality problems have been detected ever after long periods of continuous printing.

Example 5

| Weight % | Ingredient |
|---|---|
| 9 | Acrylic polymer emulsion, sold under the under name of Joncryl 538 by S.C Johnson. Emulsion of a non-curable resin |
| 20 | Glycerol. A non-curable humectant |
| 6 | Rubin pigment sold under the trade name of Hostafine Rubin F6B by Clariant GmbH |
| 0.3 | BYK-345 wetting agent |
| balance | de-ionized water |

Example 5 demonstrates a water-based ink composition comprising a non-curable resin emulsion and a conventional water-soluble humectant as a reference to example 1.

The ink was applied (18 μm thickness) on various substrates such as cardboards, PVC and plastics. The ink was heated at 90° C. for 360 seconds to evaporate the water. In comparison, as described above in relation to Example 1, the time required to fully evaporate the water for an equivalent film thickness of the composition described in example 1 was 30 seconds followed by UV curing of approximately 3.5 seconds.

Example 6

| Weight % | Ingredient |
|---|---|
| 20 | Polyether triacrylate, sold under the trade name of Ebecryl 12 by UCB Chemicals. UV-curable humectant |
| 3 | 1-[4-(2-hydroxyethyl)phenyl]-2-hydroxy-2-methylpropane-1-one, sold under the trade name of Irgacure 2959 by Ciba-Geigy. Photoinitiator |
| 6 | Rubin pigment sold under the trade name of Hostafine Rubin F6B by Clariant GmbH |
| 0.3 | BYK-345 surfactant or wetting agent |
| balance | de-ionized water |

Example 6 demonstrates a water-based ink composition comprising a UV-curable water-soluble humectant with no binder as a reference to example 1. The ink was applied (18 μm thickness) on various substrates such as cardboards, PVC and plastics. The ink was heated at 90° C. (to evaporate the water) for 30 seconds followed by UV radiation (to cure the rest of the film). In comparison to Example 1, the mechanical properties of the films obtained by the ink composition of example 6, such as abrasion resistance and water sensitivity demonstrated poor results, particularly on non-porous substrates such as PVC plastics and polycarbonates.

Example 7

| Weight % | Ingredient |
|---|---|
| 40 | Aliphatic urethane acrylate emulsion, sold under the trade name of Viactin VTE 6155w by Solutia Inc. Emulsion of a UV-curable resin |
| 2 | Bland of 2,4,6-trimethylbenzoyl-diphenyl-phosphine oxide and 2-hydroxy-2-methyl-1-phenyl-propan-1-one (50:50 mixture), sold under the trade name of Darocur 4265 by Ciba-Geigy. Photoinitiator |
| 6 | Rubin pigment sold under the trade name of Hostafine Rubin F6B by Clariant GmbH |
| 0.3 | BYK-345 surfactant or wetting agent |
| balance | de-ionized water |

Example 7 demonstrates a water-based ink composition comprising a UV-curable resin emulsion without any humectant as a reference to example 4.

The ink was applied (18 μm thickness) on various substrates such as cardboards, PVC and plastics. The ink was heated at 90° C. (to evaporate the water) for 30 seconds followed by UV radiation (to cure the rest of the film).

The composition described above has been jetted from a print head manufactured by Aprion Ltd. of Netanya, Israel and jetting properties were tested. Clogging of the print head nozzles and mis-directionality problems have been demonstrated as soon as jetting started.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An ink composition for ink-jet recording comprising:
   water;
   a water miscible resin; and
   a water soluble ultraviolet curable humectant.

2. The ink composition of claim 1 further comprising:
a water miscible photoinitiator.

3. The composition of claim 1 further comprising a dye as a coloring agent.

4. The composition of claim 1 further comprising a pigment as a coloring agent.

5. The composition of claim 1, wherein said miscible resin is an acrylic resin, a styrene acrylic resin, a carboxylated acrylic resin a polyurethane resin, a polyacetate resin, a polyvinyl chloride resin or any combination thereof.

6. The composition of claim 1, wherein said miscible resin is a water dispersible ultraviolet curable resin.

7. The composition of claim 6, wherein said water dispersible ultraviolet curable resin is an aliphatic urethane acrylate, an aromatic urethane acrylate, an epoxy acrylate, a polyester acrylate or any combination thereof.

8. The composition of claim 1, wherein said water soluble ultraviolet curable humectant is a polyalkylene glycol acrylate.

9. The composition of claim 1, wherein said water soluble ultraviolet curable humectant is a polyether acrylate.

10. The composition of claim 1, wherein said water soluble ultraviolet curable humectant is a highly ethoxylated derivative of acrylate.

11. The composition of claim 1, wherein said water soluble ultraviolet curable humectant is polyethylene glycol diacrylate.

12. The composition of claim 1, wherein said water soluble ultraviolet curable humectant is polyether triacrylate.

13. The composition of claim 1, wherein said water soluble ultraviolet curable humectant is ethoxylated trimethylololpropane triacrylate.

14. The composition of claim 1, wherein the concentration of said water soluble ultraviolet curable humectant is 5–15% by weight.

15. The composition of claim 1, wherein the concentration of said water soluble ultraviolet curable humectant is 15–30% by weight.

16. The composition of claim 1, wherein the concentration of said water soluble ultraviolet curable humectant is 30–50% by weight.

17. The composition of claim 2, wherein said water miscible photoinitiator is a water dispersible photoinitiator.

18. The composition of claim 2, wherein said water miscible photoinitiator is a water soluble photoinitiator.

* * * * *